US012280341B2

(12) United States Patent
Maeda

(10) Patent No.: US 12,280,341 B2
(45) Date of Patent: Apr. 22, 2025

(54) INTENSIFIER AND ATOMIZER USING INTENSIFIER

(71) Applicant: SUGINO MACHINE LIMITED, Uozu (JP)

(72) Inventor: Takumi Maeda, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 578 days.

(21) Appl. No.: 17/563,345

(22) Filed: Dec. 28, 2021

(65) Prior Publication Data

US 2022/0234011 A1 Jul. 28, 2022

(30) Foreign Application Priority Data

Jan. 25, 2021 (JP) ................................ 2021-009316

(51) Int. Cl.

*B01F 23/213* (2022.01)
*B01F 23/70* (2022.01)
*B01F 35/71* (2022.01)
*B08B 3/08* (2006.01)

(52) U.S. Cl.

CPC ...... *B01F 23/21321* (2022.01); *B01F 23/708* (2022.01); *B01F 35/7176* (2022.01); *B08B 3/08* (2013.01)

(58) Field of Classification Search

CPC .............. B01F 23/21321; B01F 23/708; B01F 35/7176; B05B 3/08; B08B 3/08

See application file for complete search history.

(56) References Cited

FOREIGN PATENT DOCUMENTS

| | | | | |
|---|---|---|---|---|
| EP | 3088736 | A1 | * | 11/2016 |
| JP | H06-207585 | A | | 7/1994 |
| JP | H07-003087 | Y2 | | 1/1995 |
| JP | 7-217551 | | * | 8/1995 |
| JP | 2001-090675 | A | | 4/2001 |
| JP | 2007-083133 | A | | 4/2007 |
| JP | 4933760 | B2 | * | 5/2015 |
| JP | 2016-211404 | A | | 12/2016 |
| JP | 2018-12064 | A | * | 1/2018 |

OTHER PUBLICATIONS

Partial English Translation of JP 7-217551 (Year: 1995).*
English Abstract of EP 4933760 B2 (Year: 2012).*
Abstract of EP 3088736 A1 (Year: 2016).*
Partial English Translation of JP 2018-12064 A (Year: 2018).*
Japanese Office Action mailed on Jul. 4, 2023 in a corresponding Japanese Patent Application No. 2021-009316 (6 pages).

* cited by examiner

*Primary Examiner* — Charles S Bushey
(74) *Attorney, Agent, or Firm* — United IP Counselors, LLC

(57) ABSTRACT

Provided is an intensifier capable of cleaning a portion where pressurized raw material adheres without disassembling the inside. The intensifier for pressurizing raw material using medium supplied from a driving pump including: a low-pressure cylinder to which the medium is supplied; a high-pressure cylinder fixed to the low-pressure cylinder; a piston that slides inside the low-pressure cylinder and the high-pressure cylinder by the medium supplied to the low-pressure cylinder; a bottom adapter that supports the piston for sliding motion; and a resin portion disposed on an inner periphery of the bottom adapter.

11 Claims, 5 Drawing Sheets

INTENSIFIER AND ATOMIZER USING INTENSIFIER

CROSS-REFERENCE TO RELATED APPLICATIONS

This application claims the benefit of priority to Japanese Patent Application No. 2021-009316, filed on Jan. 25, 2021, the entire contents of which are hereby incorporated by reference.

BACKGROUND

1. Technical Field

The present invention relates to an intensifier and an atomizer using an intensifier.

2. Description of the Background

Conventionally, an intensifier has been widely used as a device for pressurizing fluid or raw material. By pressurizing the fluid such as water to 100 to 250 MPa by using the intensifier, high-pressure water is used in various applications such as cleaning, cutting, breaking, etc. In addition, high value-added materials have been developed by using the intensifier to pressurize raw materials such as pharmaceutical materials, semiconductor materials, electronic materials, or chemical materials, or by forming fine particles by colliding high-pressure fluids of the pressurized raw materials, thereby changing physical properties and the like.

A development of the intensifier for cleaning the apparatus or inside the system, or for preventing contamination of the raw materials has been required in the case where a high degree of cleanliness is required, or in the case where the apparatus is used for various pressurized raw materials.

To solve such problems, the intensifier including a primary cylinder for pressurizing the raw material, and a secondary cylinder for performing cleaning and discharging when the raw material leaks from the primary cylinder has been disclosed to prevent contamination of the processing liquid contained in the secondary cylinder (e.g., Japanese Patent Application Publication H06-207585).

BRIEF SUMMARY

The conventional intensifier includes the secondary cylinders arranged at both ends of the primary cylinder. Thus, the apparatus is upsized to cause problems in terms of space and cost.

Further, the conventional intensifier has a difficulty in cleaning inside the primary cylinder or the components constituting the intensifier, while preventing leakage of the pressurized raw material and allowing to perform high cleanliness processing.

Further, the raw material having high adhesiveness or abrasiveness could enter the inside of the intensifier from a slight gap during sliding of the plunger. If not cleaned properly in such a case, the pressurized raw material adhered to the surface of the plunger could apply extra load during sliding of the plunger to cause damage to the inner surface of the packing or the bottom adapter.

An object of the present invention is to provide an intensifier and an atomizer using the intensifier that allow to clean a portion to which a pressurized raw material adheres without disassembling the inside.

One or more aspects of the present invention provides an intensifier configured to pressurize raw material using medium supplied from a driving pump, the intensifier including:

- a low-pressure cylinder to which the medium is supplied;
- a high-pressure cylinder fixed to the low-pressure cylinder;
- a piston configured to slide inside the low-pressure cylinder and the high-pressure cylinder by the medium supplied to the low-pressure cylinder;
- a bottom adapter configured to support the piston for sliding motion; and
- a resin portion disposed on an inner periphery of the bottom adapter.

The intensifier and the atomizer using the intensifier according to the present invention allow to clean the portion to which the pressurizing raw material adheres without disassembling the inside.

DETAILED DESCRIPTION

Embodiments will be described below with reference to the drawings as appropriate.

Configuration of Atomizer

Figure 1:
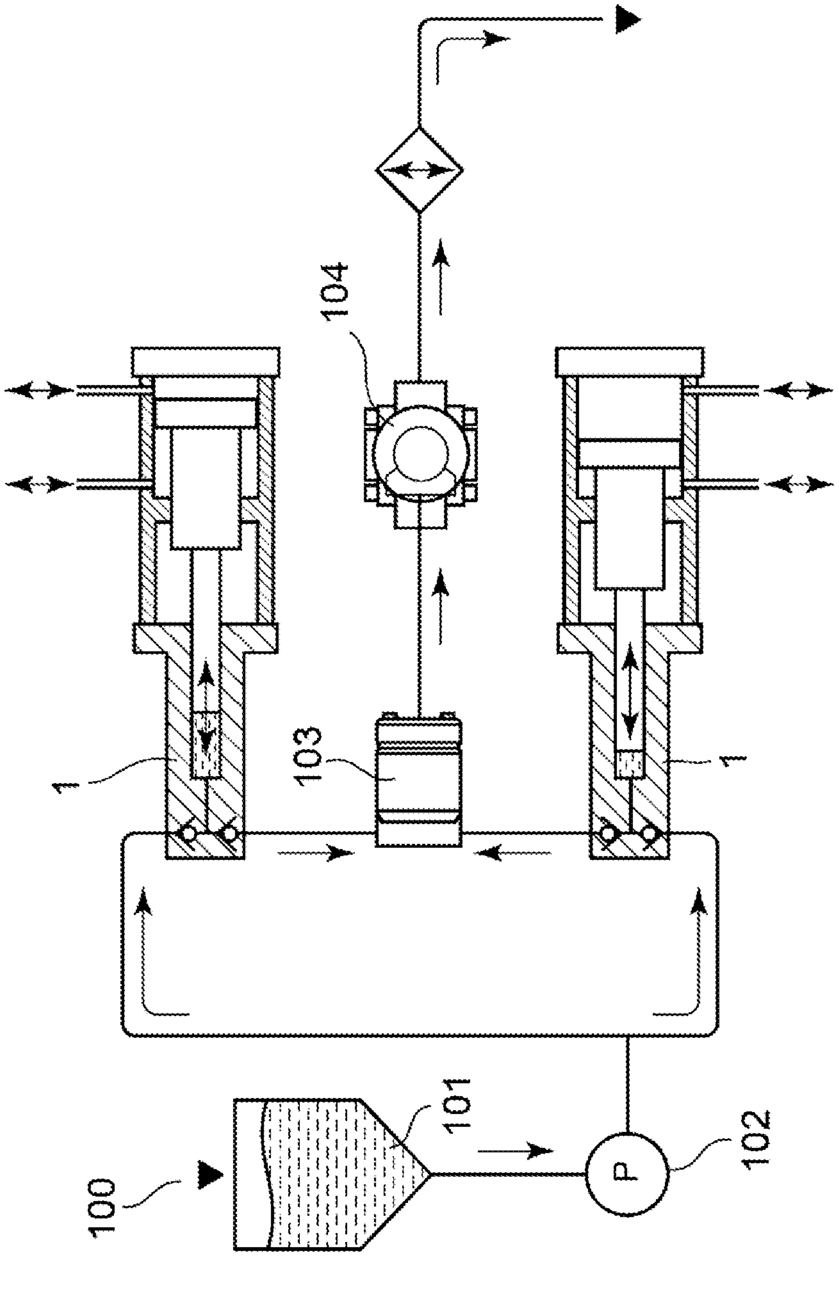
FIG. 1 shows a configuration diagram of an atomizer according to the present embodiment.

As shown in FIG. 1, an atomizer 100 according to the embodiment includes a raw material tank 101, a liquid supply pump 102, an intensifier 1, an ultra-high pressure filter 103, and an ejection chamber 104. The raw material tank 101 stores raw material M (slurry). The liquid supply pump 102 pumps the raw material M in the raw material tank 101. The intensifier 1 pressurizes the raw material M supplied from the liquid supply pump 102. The ultra-high pressure filter 103 filters the pressurized raw material M. The ejection chamber 104 performs atomization processing.

Structure of Intensifier

Figure 2:
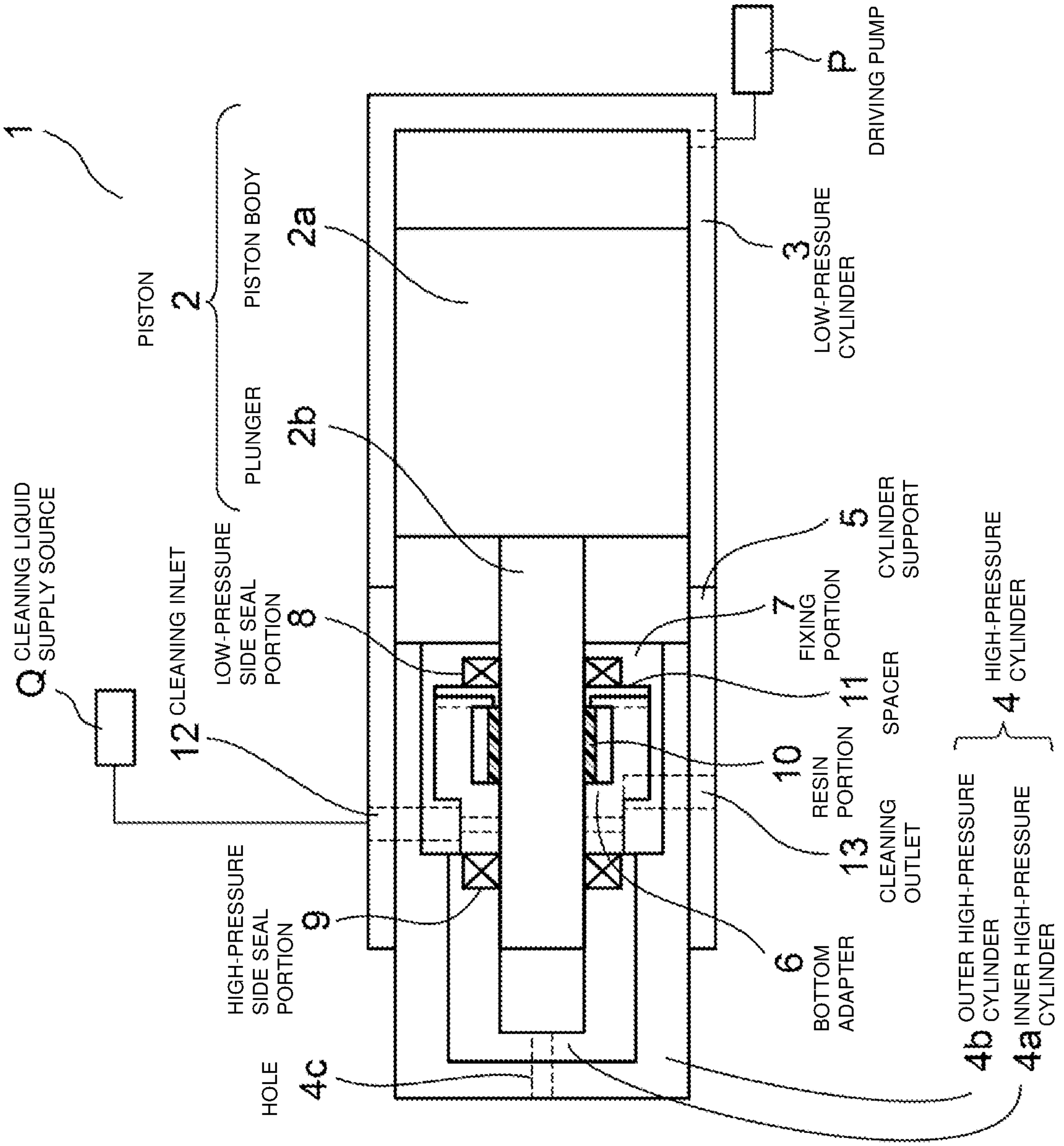
FIG. 2 is a cross-sectional view of an intensifier according to the present embodiment.

As shown in FIG. 2, the intensifier 1 of the present embodiment includes a piston 2, a low-pressure cylinder 3, and a high-pressure cylinder 4. The high-pressure cylinder 4 has a hole 4*c*. When a driving pump P (hydraulic pump) supplies the medium O into the low-pressure cylinder 3, the piston 2 slides toward the high-pressure side to pressurize the raw material M supplied from the liquid supply pump 102 into the high-pressure cylinder 4 through the hole 4*c* to 100 to 245 MPa. The piston 2 includes a piston body 2*a* and a plunger 2*b*. The piston body 2*a* slides inside the low-pressure cylinder 3. The plunger 2*b* slides inside the high-pressure cylinder 4. In particular, as the plunger 2*b* contacts the raw material M at the distal end and repeatedly slides in a pressurized state, the plunger 2*b* is made of material having pressure resistance, heat resistance, and impact resistance.

The low-pressure cylinder 3 and the high-pressure cylinder 4 each have a cylindrical shape. The low-pressure cylinder 3 and the high-pressure cylinder 4 are pressure-resistant cylinders for pressurizing the raw material M to 100 to 245 MPa. The hole 4*c* is a passage for supplying the raw material M from the liquid supply pump 102. The hole 4*c* is smaller than an inner diameter of the high-pressure cylinder 4.

The high-pressure cylinder 4 includes an inner high-pressure cylinder 4*a* and an outer high-pressure cylinder 4*b*. The inner high-pressure cylinder 4*a* has a space for pressurizing the raw material. The outer high-pressure cylinder 4*b* is disposed around the inner high-pressure cylinder 4*a*. The inner high-pressure cylinder 4*a* has high pressure resistance, and strong surface resistance against the raw material M or the like. The outer high-pressure cylinder 4*b* is made of a material to strongly fix members together. Providing separate characteristics to the inner high-pressure cylinder 4*a* and the outer high-pressure cylinder 4*b* improves the function of the high-pressure cylinder 4.

Reliably fixing the low-pressure cylinder 3 and the high-pressure cylinder 4 forms a single cylinder. A cylinder support 5 is disposed between the low-pressure cylinder 3 and the high-pressure cylinder 4 to suppress load applied to each of the low-pressure cylinder 3 and the high-pressure cylinder 4. The cylinder support 5, which has a cylindrical shape, fixes the low-pressure cylinder 3 and the high-pressure cylinder 4.

The low-pressure cylinder 3 and the high-pressure cylinder 4 are sealed, respectively. Thus, the medium O in the low-pressure cylinder 3 and the raw material M in the high-pressure cylinder 4 are not mixed.

Here, simply by partitioning the cylinder (the low-pressure cylinder 3, the high-pressure cylinder 4), the medium O or raw material M could enter due to the positional shift or sliding when the piston 2 slides. Thus, a bottom adapter 6 and a fixing portion 7 are disposed to the high-pressure cylinder 4 to improve the device stability.

Figure 3:
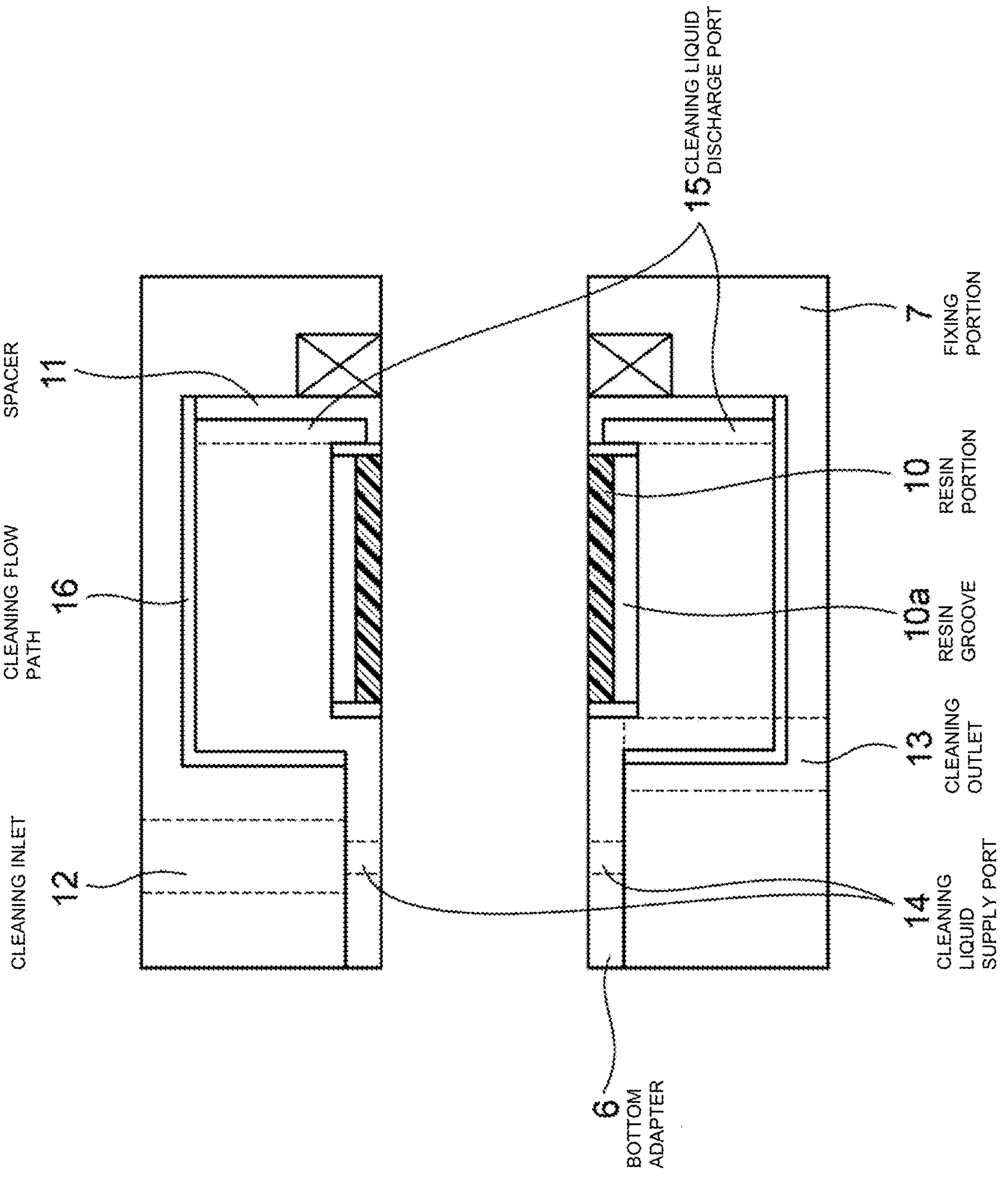
FIG. 3 is a cross-sectional view of a bottom adapter according to the present embodiment.
Figure 4:
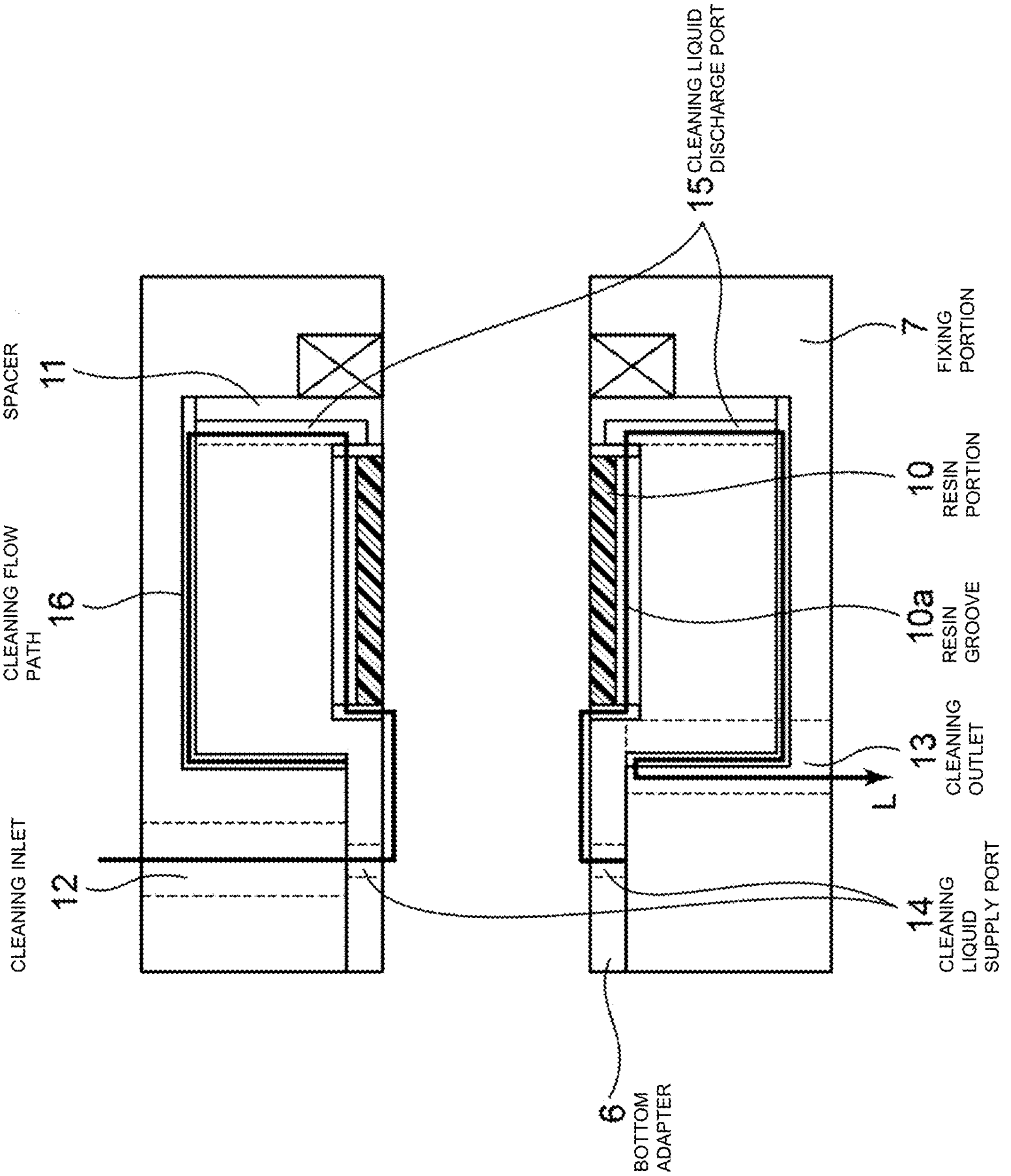
FIG. 4 is a cross-sectional view of the bottom adapter showing a flow path of cleaning liquid according to the present embodiment.
Figure 5:
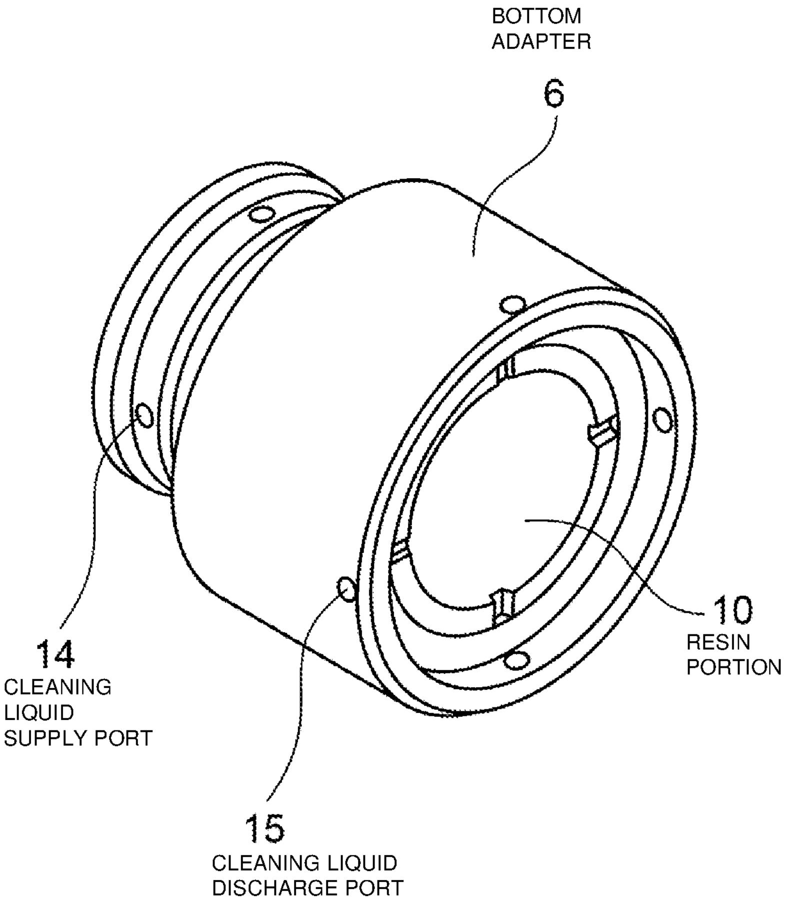
FIG. 5 is a perspective view of the bottom adapter according to the present embodiment.

As shown in FIGS. 3 to 5, the bottom adapter 6 supports the piston 2 for sliding motion. The plunger 2*b* passes through the bottom adapter 6. The fixing portion 7 stably fixes the bottom adapter 6 to the inside of the high-pressure cylinder 4. The fixing portion 7 is held between the high-pressure cylinder 4 and the bottom adapter 6.

The surface of the bottom adapter 6 may wear due to the sliding of the piston 2 for a long time. A resin portion 10 is disposed on an inner periphery of the bottom adapter 6 to reduce the sliding load of the bottom adapter 6 and the piston 2. The resin portion 10 is detachably attached inside the bottom adapter 6. Thus, the resin portion 10 is replaceable when the resin portion 10 is worn due to the sliding of the piston 2. This eliminates replacing a large element such as the bottom adapter 6 to reduce the maintenance cost.

The material of the resin portion 10 preferably has high pressure resistance, heat resistance, and impact resistance. The material of the resin portion 10 is, for example, a thermoplastic resin. Further, a chemical load may be applied on the surface of the inner high-pressure cylinder 4*a* or the plunger 2*b* when processing is performed using a solvent with respect to the raw material M. In such a case, using a material of the resin portion 10 suitable for various solvents (acid resistance, alkali resistance, or the like) allows to improve the lifetime of the resin portion 10

Arranging the various sealing members in addition to the bottom adapter 6 that supports the piston 2 for sliding motion improves the sealing property. As shown in FIG. 2, a low-pressure side seal portion 8 and a high-pressure side seal portion 9 are disposed at a portion or both ends of the bottom adapter 6. The low-pressure side seal portion 8 and the high-pressure side seal portion 9 are, for example, elastic members or packings. Further, arranging a spacer 11 on the low-pressure side of the bottom adapter 6 reliably seals the entering of the raw material M into the low-pressure side or the flowing inside the cleaning liquid L. The spacer 11 is disposed in a state in which the plunger 2*b* is slidable. The spacer 11 closes the low-pressure side end of the bottom adapter 6. The spacer 11 has a distal end that presses the end of the bottom adapter 6 so as not to block a cleaning liquid discharge port 15 and a resin groove 10*a*. The distal end of the spacer 11 has a thickness equivalent to the thickness of the resin portion 10. This appropriately fixes and seals the bottom adapter 6 and the spacer 11.

Structure of Cleaning Flow Path

As shown in FIG. 4, a cleaning flow path in the intensifier 1 according to the present embodiment includes a cleaning liquid supply port 14 formed in the bottom adapter 6, a cleaning liquid discharge port 15, a resin groove 10*a* of the resin portion 10, and a cleaning flow path 16.

The cleaning liquid supply port 14 is a flow path formed on the high-pressure side of the bottom adapter 6. Cleaning liquid L is supplied from a cleaning liquid supply source Q to the cleaning liquid supply port 14. When the bottom adapter 6 is fixed by the fixing portion 7, the high-pressure cylinder 4, or the cylinder support 5 or the like, a cleaning inlet 12 is formed as a flow path for communicating the components. The cleaning liquid L is supplied from the cleaning inlet 12 to the cleaning liquid supply port 14

The cleaning liquid discharge port 15 is a flow path formed on the low-pressure side of the bottom adapter 6. The cleaning liquid L is discharged to the outside through the cleaning liquid discharge port 15. When the bottom adapter 6 is fixed by the fixing portion 7, the high-pressure cylinder 4, or the cylinder support 5 or the like, a cleaning outlet 13 is formed as a flow path for communicating the components. The cleaning liquid L is discharged to the outside from the cleaning outlet 13 via the cleaning flow path 16.

A plurality of the cleaning liquid supply ports 14 and a plurality of the cleaning liquid discharge ports 15 are uniformly arranged in the circumferential direction of the bottom adapter 6. This washes the raw material M entering the periphery of the bottom adapter 6 with the cleaning liquid L.

The cleaning outlet 13 is disposed at a position coaxially or slightly shifted with the cleaning inlet 12. FIGS. 2 to 4 show the case where the cleaning outlet 13 is arranged at a position slightly shifted from the cleaning inlet 12. The cleaning outlet 13 discharges the cleaning liquid L from the cleaning liquid discharge port 15 through the cleaning flow path 16 without communicating with the cleaning liquid supply port 14.

The cleaning flow path 16 is a flow path for discharging the cleaning liquid L from the cleaning liquid discharge port 15 to the outside. In a state where the bottom adapter 6 and the fixing portion 7 is fixed, the cleaning flow path 16 is formed on the outer periphery of the bottom portion and the inner periphery of the fixing portion 7. The flow path that is too large also adversely affects the fixing state of the bottom adapter 6 and the fixing portion 7, thus the flow path is constituted by the necessary minimum space.

The cleaning liquid L supplied to the cleaning inlet 12 passes through the cleaning liquid supply port 14 to lead to the gap between the high-pressure side of the inner periphery of the bottom adapter 6 and the plunger 2*b*. The cleaning liquid L then passes through the resin groove 10*a*, the cleaning liquid discharge port 15, and the cleaning flow path 16 to be discharged from the cleaning outlet 13. The cleaning liquid L circulated around the outer periphery of the bottom adapter 6 before discharged cleans the entire periphery of the bottom adapter 6.

The resin groove 10*a* is formed on the outer periphery of the resin portion 10. The gap between the inner peripheral surface of the bottom adapter 6 and the resin groove 10*a* becomes a part of the cleaning flow path for the cleaning liquid L supplied from the cleaning liquid supply port 14 to pass through during internal cleaning. The plurality of the resin grooves 10*a* are uniformly arranged in the circumferential direction. This cleans the raw material M entering the inside of the bottom adapter 6 with the cleaning liquid L. The resin groove 10*a* may have any shape such as a polygonal shape or an arc shape as long as the width allows the raw material M to be discharged with the cleaning liquid L. Further, any number (four, six, eight or the like) of the resin grooves 10*a* may be formed as long as the resin grooves 10*a* are disposed evenly in the circumferential direction.

Further, the atomizer 100 having the intensifier 1 according to the present embodiment simultaneously performs cleaning and cooling during pressurizing the raw material M without stopping the atomizer 100, which reduces the working time. Further, the atomizer 100 is applicable as a cooling mechanism before, during, or after pressurizing the raw material M.

Hereinafter, a processing procedure of the atomizer 100 according to the present embodiment will be described.

First, the raw material M to be processed is put into the raw material tank 101 to be adjusted into a slurry state. Next, the raw material M in the raw material tank 101 is supplied to the intensifier 1 by the liquid supply pump 102. The supplied raw material M is pressurized by the intensifier 1. Then, the pressurized raw material M supplied to the ejection chamber 104 after passing through the ultra-high pressure filter 103 is ejected. This process may be repeated multiple times, not only once.

Here, the procedure of the cleaning process in the intensifier 1 will be described in detail.

First, the cleaning liquid L is supplied from the cleaning liquid supply source Q to the cleaning liquid supply port 14 during the pressurizing process of the raw material M. When the bottom adapter 6 is fixed by the fixing portion 7 or the cylinder support 5, the cleaning liquid L is supplied from the cleaning inlet 12 to the cleaning liquid supply port 14. A plurality of the cleaning liquid supply ports 14 are uniformly arranged in the circumferential direction. Thus, the cleaning liquid L flows the gap of the outer periphery of the high-pressure side of the bottom adapter 6 and the inner periphery of the fixing portion 7 over the entire circumference to clean the outer periphery of the high-pressure side of the bottom adapter 6.

Next, the cleaning liquid L passes from a plurality of the cleaning liquid supply port 14 uniformly disposed in the circumferential direction through a portion of the inner periphery of the low-pressure side of the bottom adapter 6 and the inner periphery of the plunger 2*b* to clean the resin groove 10*a*.

Further, the cleaning liquid L is discharged from the cleaning liquid discharge port 15 When the bottom adapter 6 is fixed by the fixing portion 7 or the cylinder support 5, the cleaning liquid L is discharged from the cleaning outlet 13 communicating with the cleaning liquid discharge port 15.

Placing the position of the cleaning outlet 13 in a position coaxially or shifted with the cleaning inlet 12, and forming the cleaning flow path 16 that is a gap between the bottom adapter 6 and the fixing portion 7 allow to clean the outer periphery of the bottom adapter 6. In this case, the cleaning liquid L discharged from the cleaning liquid discharge port 15 passes through the cleaning flow path 16 to clean the section to the cleaning outlet 13.

This series of internal cleaning cleans the raw material M entering the inner periphery and the outer periphery of the bottom adapter 6.

In the specification, the contents for cleaning are described, but the present invention can also be applied to a cooling mechanism before, during, or after pressurizing the raw material M. Further, during pressurizing the raw material M, simultaneously performing cleaning and cooling without stopping the atomizer 100 reduces the working time.

As described above, the present invention is not limited to the above-described embodiment, and it is needless to say that the present invention can be appropriately modified without departing from the spirit thereof.

REFERENCE SIGNS LIST

1 Intensifier
2 Piston
2*a* Piston body
2*b* Plunger
3 Low-pressure cylinder
4 High-pressure cylinder
4*a* Inner high-pressure cylinder
4*b* Outer high-pressure cylinder
4*c* Hole
5 Cylinder support
6 Bottom adapter
7 Fixing portion
8 Low-pressure side seal portion
9 High-pressure side seal portion
10 Resin portion
10*a* Resin groove
11 Spacer
12 Cleaning inlet
13 Clean outlet
14 Cleaning liquid supply port
15 Cleaning liquid discharge port
16 Cleaning flow path
100 Atomizer
101 Raw material tank
102 Liquid supply pump
103 Ultra-high pressure filter
104 Ejection chamber
P Driving pump (hydraulic pump)
Q Cleaning liquid supply source
M Raw materials
O Medium
L Cleaning liquid

What is claimed is:

1. An intensifier configured to pressurize raw material using medium supplied from a driving pump, the intensifier comprising:

a low-pressure cylinder to which the medium is supplied;

a high-pressure cylinder fixed to the low-pressure cylinder;

a piston configured to slide inside the low-pressure cylinder and the high-pressure cylinder by the medium supplied to the low-pressure cylinder;

a bottom adapter configured to support the piston for sliding motion, the bottom adapter including a cleaning liquid supply port to which cleaning liquid is supplied and a cleaning liquid discharge port through which the cleaning liquid supplied into the bottom adapter is discharged;

a fixing portion disposed radially outside of and overlying the bottom adapter and configured to fix the bottom adapter inside the high-pressure cylinder; and an axially extending resin portion disposed along an inner periphery of the bottom adapter in position to support sliding movement of the piston, wherein a cleaning flow path through which the cleaning liquid is discharged from the cleaning liquid discharge port extends axially along an outer periphery of the bottom adapter and an inner periphery of the fixing portion in a gap therebetween.

2. The intensifier according to claim 1, wherein the resin portion includes a resin groove on an outer periphery thereof, the resin groove forming part of the cleaning flow path.

3. The intensifier according to claim 1, wherein the bottom adapter includes a plurality of the cleaning liquid supply ports disposed evenly in a circumferential direction, and a plurality of the cleaning liquid discharge ports disposed evenly in the circumferential direction.

4. The intensifier according to claim 1, further comprising:

a cleaning inlet through which the cleaning liquid flows from outside, the cleaning inlet communicating with the cleaning liquid supply port; and a cleaning outlet through which the cleaning liquid is discharged to outside, the cleaning outlet communicating with the cleaning liquid discharge port.

5. The intensifier according to claim 1, further comprising a cleaning outlet that is at a position axially shifted from a cleaning inlet without communicating with the cleaning liquid supply port.

6. The intensifier according to claim 3, further comprising:

a cleaning inlet through which the cleaning liquid flows from outside, the cleaning inlet communicating with the cleaning liquid supply ports; and a cleaning outlet through which the cleaning liquid is discharged to outside, the cleaning outlet communicating with the cleaning liquid discharge ports.

7. An atomizer, comprising:

a liquid supply pump configured to pressurize and supply raw material;

the intensifier according to claim 1 for pressurizing the raw material;

an ultra-high pressure filter configured to filter the pressurized raw material; and an ejection chamber configured to eject the filtered raw material.

8. An atomizer, comprising:

a liquid supply pump configured to pressurize and supply raw material;

the intensifier according to claim 2 for pressurizing the raw material;

an ultra-high pressure filter configured to filter the pressurized raw material; and an ejection chamber configured to eject the filtered raw material.

9. An atomizer, comprising:

a liquid supply pump configured to pressurize and supply raw material;

the intensifier according to claim 3 for pressurizing the raw material;

an ultra-high pressure filter configured to filter the pressurized raw material; and an ejection chamber configured to eject the filtered raw material.

10. An atomizer, comprising:

a liquid supply pump configured to pressurize and supply raw material;

the intensifier according to claim 4 for pressurizing the raw material;

an ultra-high pressure filter configured to filter the pressurized raw material; and an ejection chamber configured to eject the filtered raw material.

11. An atomizer, comprising:

a liquid supply pump configured to pressurize and supply raw material;

the intensifier according to claim 5 for pressurizing the raw material;

an ultra-high pressure filter configured to filter the pressurized raw material; and an ejection chamber configured to eject the filtered raw material.

* * * * *